(12) United States Patent
Jang et al.

(10) Patent No.: US 11,827,731 B2
(45) Date of Patent: Nov. 28, 2023

(54) PHOTOPOLYMER COMPOSITION

(71) Applicant: LG CHEM, LTD., Seoul (KR)

(72) Inventors: Seokhoon Jang, Daejeon (KR); Heon Kim, Daejeon (KR); Se Hyun Kwon, Daejeon (KR); Yeongrae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 198 days.

(21) Appl. No.: 17/260,760

(22) PCT Filed: Jan. 10, 2020

(86) PCT No.: PCT/KR2020/000496
§ 371 (c)(1),
(2) Date: Jan. 15, 2021

(87) PCT Pub. No.: WO2020/153638
PCT Pub. Date: Jul. 30, 2020

(65) Prior Publication Data
US 2021/0301055 A1    Sep. 30, 2021

(30) Foreign Application Priority Data

Jan. 25, 2019    (KR) .................. 10-2019-0009986

(51) Int. Cl.
| C08F 263/04 | (2006.01) |
| C08K 5/02 | (2006.01) |
| C08K 5/521 | (2006.01) |
| C08L 31/04 | (2006.01) |

(52) U.S. Cl.
CPC .............. *C08F 263/04* (2013.01); *C08K 5/02* (2013.01); *C08K 5/521* (2013.01); *C08L 31/04* (2013.01)

(58) Field of Classification Search
CPC .................. C08L 31/04; C08K 5/02
See application file for complete search history.

(56) References Cited

U.S. PATENT DOCUMENTS

| 4,827,042 A | 5/1989 | Lagow et al. |
| 5,202,501 A | 4/1993 | Lagow et al. |
| 7,615,283 B2 | 11/2009 | Radcliffe et al. |
| 8,231,973 B2 | 7/2012 | Radcliffe et al. |
| 8,815,472 B2 | 8/2014 | Miki et al. |
| 2004/0137334 A1 | 7/2004 | Otaki et al. |
| 2006/0009599 A1 | 11/2006 | Tanaka et al. |
| 2008/0305404 A1 | 12/2008 | Kawaguchi |
| 2010/0266936 A1 | 10/2010 | Otaki et al. |
| 2012/0231376 A1 | 9/2012 | Rölle et al. |
| 2017/0045816 A1 | 2/2017 | Facke et al. |
| 2019/0339612 A1 | 11/2019 | Kim et al. |

FOREIGN PATENT DOCUMENTS

| CN | 101061442 A | 10/2007 |
| CN | 102667934 A | 9/2012 |
| CN | 106232651 A | 12/2016 |
| JP | 63501367 A | 5/1988 |
| JP | H05-210344 A | 8/1993 |
| JP | H05-273899 A | 10/1993 |
| JP | 0764930 B2 | 7/1995 |
| JP | 2004051771 A * | 2/2004 |
| JP | 2004115640 A * | 4/2004 |
| JP | 2004-191919 A | 7/2004 |
| JP | 2004-318068 A | 11/2004 |
| JP | 4500532 B2 | 7/2010 |
| JP | 2013510203 A | 3/2013 |
| KR | 10-0127859 B1 | 4/1998 |
| KR | 10-2005-0085623 A | 8/2005 |
| KR | 10-2009-0021166 A | 2/2009 |
| KR | 10-2009-0074019 A | 7/2009 |
| KR | 10-2012-0107086 A | 9/2012 |
| KR | 10-2018-0119394 A | 11/2018 |
| WO | 2008-123302 A1 | 10/2008 |
| WO | 2018-199467 A1 | 11/2018 |

OTHER PUBLICATIONS

Machine translation of JP-2004051771-A (Year: 2004).*
Park et al (Highly fluorinated and photocrosslinkable liquid prepolymers for flexible optical waveguides, Journal of Materials Chemistry, 2011, 21, 1755-1761). (Year: 2011).*
Machine translation of JP-2004115640-A (Year: 2004).*

* cited by examiner

*Primary Examiner* — Wenwen Cai
(74) *Attorney, Agent, or Firm* — Bryan Cave Leighton Paisner LLP

(57) ABSTRACT

The present disclosure relates to a photopolymer composition for hologram production comprising a polymer matrix or a precursor thereof having a glass transition temperature of 80° C. or less; a photoreactive monomer; a low refractive index fluorine-based compound; and a photoinitiator, a hologram recording medium produced from the photopolymer composition, an optical element comprising the hologram recording medium, and a holographic recording method using the hologram recording medium.

11 Claims, No Drawings

PHOTOPOLYMER COMPOSITION

TECHNICAL FIELD

Cross-Reference to Related Application(s)

This application is a 35 U.S.C. 371 National Phase Application of PCT/KR2020/000496 filed on Jan. 10, 2020, which claims priority to and the benefits of Korean Patent Application No. 10-2019-0009986 filed on Jan. 25, 2019 with the Korean Intellectual Property Office, the disclosures of which are incorporated herein by reference in their entirety.

The present disclosure relates to a photopolymer composition, a hologram recording medium, an optical element and a holographic recording method.

BACKGROUND ART

Hologram recording medium records information by changing a refractive index in the holographic recording layer in the medium through an exposure process, reads the variation of refractive index in the medium thus recorded, and reproduces the information.

When a photopolymer (photosensitive resin) is used, the light interference pattern can be easily stored as a hologram by photopolymerization of the low molecular weight monomer. Therefore, the photopolymer can be used in various fields such as optical lenses, mirrors, deflecting mirrors, filters, diffusing screens, diffraction elements, light guides, waveguides, holographic optical elements having projection screen and/or mask functions, medium of optical memory system and light diffusion plate, optical wavelength multiplexers, reflection type, transmission type color filters, and the like.

Typically, a photopolymer composition for hologram production comprises a polymer binder, a monomer, and a photoinitiator, and the photosensitive film produced from such a composition is irradiated with laser interference light to induce photopolymerization of local monomers.

In a portion where a relatively large number of monomers are present in such photopolymerization process, the refractive index becomes high. And in a portion where a relatively large number of polymer binders are present, the refractive index is relatively lowered and thus the refractive index modulation occurs, and a diffraction grating is generated by such refractive index modulation. The value n of refractive index modulation is influenced by the thickness and the diffraction efficiency (DE) of the photopolymer layer, and the angular selectivity increases as the thickness decreases.

Recently, development of materials capable of maintaining a stable hologram with a high diffraction efficiency has been demanded, and also various attempts have been made to manufacture a photopolymer layer having a large value of refractive index modulation even while having a thin thickness.

DETAILED DESCRIPTION OF THE INVENTION

Technical Problem

It is one object of the present disclosure to provide a photopolymer composition for hologram production, which can provide high refractive index modulation value and diffraction efficiency while having a thin thickness, and which has a relatively fast reaction rate and thus can shorten recording time, and which can realize high sensitivity to a recording light and improve recording efficiency.

It is another object of the present disclosure to provide a hologram recording medium which can provide a higher refractive index modulation value and diffraction efficiency while having a thin thickness, and which has a relatively fast reaction rate and thus can shorten recording time, and which can realize high sensitivity to a recording light and improve recording efficiency.

It is still another object of the present disclosure to provide an optical element comprising the above-mentioned hologram recording medium.

It is a further object of the present disclosure to provide a holographic recording method comprising selectively polymerizing the photoreactive monomer contained in the hologram recording medium by a coherent laser light.

Technical Solution

Provided herein is a photopolymer composition for hologram production comprising: a polymer matrix or a precursor thereof having a glass transition temperature of 80° C. or less; a photoreactive monomer; a low refractive index fluorine-based compound; and a photoinitiator.

Also provided herein is a hologram recording medium produced from the above-mentioned photopolymer composition.

Further provided herein is an optical element including the above-mentioned hologram recording medium.

Further provided herein is a holographic recording method comprising selectively polymerizing the photoreactive monomer contained in the above-mentioned hologram recording medium using a coherent light source.

Hereinafter, the photopolymer composition, the hologram recording medium, the optical element and the holographic recording method according to specific embodiments of the present disclosure will be described in more detail.

As used herein, the term "(meth)acrylate" refers to either methacrylate or acrylate.

As used herein, the term "(co)polymer" refers to either a homopolymer or a copolymer (including a random copolymer, a block copolymer, and a graft copolymer).

As used herein, the term "hologram" refers to a recording medium in which optical information is recorded in an entire visible range and a near ultraviolet range (300 to 800 nm) through an exposure process, and examples thereof include all of visual holograms such as in-line (Gabor) holograms, off-axis holograms, full-aperture transfer holograms, white light transmission holograms ("rainbow holograms"), Denisyuk holograms, off-axis reflection holograms, edge-lit holograms or holographic stereograms.

In the present specification, the alkyl group may be a straight chain or a branched chain, and the number of carbon atoms thereof is not particularly limited, but is preferably 1 to 40. According to one embodiment, the alkyl group has 1 to 20 carbon atoms. According to another embodiment, the alkyl group has 1 to 10 carbon atoms. According to still another embodiment, the alkyl group has 1 to 6 carbon atoms. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, and the like, but are not limited thereto.

In the present specification, the alkylene group is a bivalent functional group derived from alkane, and may be, for example, linear, branched or cyclic methylene group, ethylene group, propylene group, isobutylene group, sec-butylene group, tert-butylene group, pentylene group, hexylene group, and the like.

According to one embodiment of the present disclosure, there may be provided a photopolymer composition for hologram production comprising: a polymer matrix or a precursor thereof having a glass transition temperature of 80° C. or less; a photoreactive monomer; a low refractive index fluorine-based compound; and a photoinitiator.

The present inventors have found through experiments that when the photopolymer composition hologram production including the above-mentioned components is used, it is possible to produce a hologram which can realize a higher refractive index modulation value and diffraction efficiency even while having a thin thickness, has a relatively fast reaction rate and thus can shorten the recording time, and can realize high sensitivity to a recording light and improve recording efficiency, thereby completing the present disclosure.

As the photopolymer composition for hologram production uses the polymer matrix or a precursor thereof having a glass transition temperature of 80° C. or less and the photoreactive monomer together, it can more easily improve a refractive index modulation value and a diffraction efficiency, and has a relatively fast reaction rate SUBSTITUTE SPECIFICATION (clean) when applying a holographic medium and thus can shorten the recording time.

The polymer matrix or the precursor thereof may serve as a support for the holographic recording medium and a final product produced therefrom, and the photoreactive monomer may serve as a recording monomer. In accordance with the use thereof, the photoreactive monomer may be selectively polymerized on the polymer matrix during holographic recording, thus exhibiting refractive index modulation due to portions having different refractive indices.

The polymer matrix or the precursor thereof may have a glass transition temperature of 80° C. or less, 60° C. or less, or 10° C. to 80° C., or 20° C. to 60° C., or 25° C. to 45° C. As the polymer matrix or the precursor thereof has the above-mentioned glass transition temperature, it is possible to ensure sufficient mobility of the components in the photopolymer composition during recording while having thermal stability at room temperature.

The polymer matrix or the precursor thereof can be used without particular limitation as long as it is a compound that can be commonly used in a photopolymer composition providing a holographic recording medium.

For example, the polymer matrix or the precursor thereof having a glass transition temperature of 80° C. or less may include at least one polymer selected from the group consisting of polyvinyl acetate, polyvinyl butyrate, polyvinyl formal, polyvinyl carbazole, polyacrylic acid, polymethacrylonitrile, polyacrylonitrile, poly-1,2-dichloroethylene, ethylene-vinyl acetate copolymers, polymethyl methacrylate, syndiotactic polymethyl methacrylate, poly-α-vinyl naphthalate, polycarbonate, cellulose acetate, cellulose triacetate, cellulose acetate butyrate, polystyrene, poly-α-methylstyrene, poly-o-methylstyrene, poly-p-methylstyrene, poly-p-phenylstyrene, poly-p-chlorostyrene, poly-2,5-dichlorostyrene, polyarylate, polysulfone, polyethersulfone, hydrogenated styrene-butadiene-styrene copolymers, copolymers of (meth)acrylic acid cyclic aliphatic ester and methyl(meth)acrylate, polyurethane, polytetrafluoroethylene and polyvinylidene fluoride.

More specifically, the polymer matrix or the precursor thereof having a glass transition temperature of 80° C. or less may include polyvinyl acetate having a glass transition temperature of 20° C. to 60° C., or 25° C. to 45° C. and a weight average molecular weight of 50,000 to 600,000.

The weight average molecular weight means a weight average molecular weight (unit: g/mol) converted in terms of polystyrene measured by GPC method. In the process of determining the weight average molecular weight converted in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions man include a temperature of 30° C., chloroform solvent and a flow rate of 1 mL/min.

The glass transition temperature can be measured using a dynamic mechanical analyzer (DMA), a differential scanning calorimetry (DSC) or the like. As a specific example of a method of measuring the glass transition temperature, there may be mentioned a method of measuring the change in the amount of heat due to the temperature of the polymer matrix or precursor in the region of −50° C. to 100° C. under the setting condition of a temperature rising rate of 10° C./min using a DSC (differential scanning calorimetry) measuring equipment.

Since the low refractive index fluorine-based compound has stability with little reactivity and has low refraction properties, the refractive index of the polymer matrix when added to the photopolymer composition can be made lower, Thus, the refractive index modulation with the monomer can be maximized and the diffraction efficiency of the finally produced hologram recording medium can be further increased.

The low refractive index fluorine-based compound may have a refractive index of less than 1.45, or 1.3 or more and less than 1.45. The low refractive index fluorine-based compound can further reduce the refractive index of the polymer matrix through a lower refractive index than the photoreactive monomer, thereby maximizing the refractive index modulation with the monomer.

Examples of the low refractive index fluorine-based compound may be a compound including at least one functional group selected from the group consisting of an ether group; an ester group; and an amide group, and at least two difluoromethylene groups.

The low refractive index fluorine-based compound has a refractive index of less than 1.45, and may be a compound containing at least one functional group selected from the group consisting of an ether group, an ester group and an amide group, and at least two difluoromethylene groups.

Specifically, the low refractive index fluorine-based compound may have a structure in which a functional group containing an ether group is bonded to both ends of a central functional group containing a direct bond or an ether bond between two difluoromethylene groups.

Specific examples of the low refractive index fluorine-based compound may include a compound represented by the following Chemical Formula 1 in which a functional group containing an ether group is bonded to both ends of a central functional group containing an ether bond or a direct bond between two difluoromethylene groups.

[Chemical Formula 1]

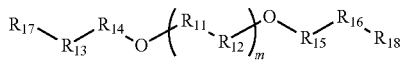

in the Chemical Formula 1, $R_{11}$ and $R_{12}$ are each independently a difluoromethylene group, $R_{13}$ and $R_{16}$ are each independently a methylene group, $R_{14}$ and $R_{15}$ are each independently a difluoromethylene group, $R_{17}$ and $R_{18}$ are each independently a polyalkylene oxide group, and m is an integer of 1 or more, or 1 to 10, or 1 to 3.

Preferably, in Chemical Formula 1, $R_{11}$ and $R_{12}$ are each independently a difluoromethylene group, $R_{13}$ and $R_{16}$ are each independently a methylene group, $R_{14}$ and $R_{15}$ are each independently a difluoromethylene group, $R_{17}$ and $R_{18}$ are each independently a 2-methoxyethoxymethoxy group, and m is an integer of 2.

Specifically, the content of the low refractive index fluorine-based compound may be 10 to 250 parts by weight, 20 to 150 parts by weight, or 40 to 10) parts by weight, based on 100 parts by weight of the photoreactive monomer.

When the content of the low refractive index fluorine-based compound relative to the photoreactive monomer is too small, the refractive index modulation value after recording may be lowered due to the lack of low refractive index components. When the content of the low refractive index fluorine-based compound relative to the photoreactive monomer is too large, haze may occur due to compatibility problems with other components, or a problem may occur in which a part of the fluorine-based compound is eluted on the surface of the coating layer.

The low refractive index fluorine-based compound may have a weight average molecular weight (measured by GPC) of 300 or more, or 300 to 1,000. A specific method of measuring the weight average molecular weight is as described above.

Meanwhile, the photoreactive monomer may include a polyfunctional (meth)acrylate monomer or a monofunctional (meth)acrylate monomer.

As described above, in a portion where the monomer is polymerized in the process of photopolymerization of the photopolymer composition and the polymer is present in relatively large amounts, the refractive index becomes high. In a portion where the polymer binder is present in relatively large amounts, the refractive index becomes relatively low, the refractive index modulation occurs, and a diffraction grating is generated by such refractive index modulation.

Specifically, one example of the photoreactive monomer may include (meth)acrylate-based α,β-unsaturated carboxylic acid derivative, for example, (meth)acrylate, (meth)acrylamide, (meth)acrylonitrile, (meth)acrylic acid or the like, or a compound containing a vinyl group or a thiol group.

One example of the photoreactive monomer may include a polyfunctional (meth)acrylate monomer having a refractive index of 1.5 or more, 1.53 or more, or 1.5 to 1.7. The polyfunctional (meth)acrylate monomer having a refractive index of 1.5 or more, or 1.53 or more, or 1.5 to 1.7 may include a halogen atom (bromine, iodine, etc.), sulfur (S), phosphorus (P), or an aromatic ring.

More specific examples of the polyfunctional (meth) acrylate monomer having a refractive index of 1.5 or more include bisphenol A modified diacrylate type, fluorene acrylate type (HR6022, etc.—Miwon Specialty Chemical), bisphenol fluorene epoxy acrylate type (HR6100, HR6060, HR6042, etc.—Miwon Specialty Chemical), halogenated epoxy acrylate series (HR1139, HR3362, etc.—Miwon Specialty Chemical).

Another example of the photoreactive monomer may include a monofunctional (meth)acrylate monomer. The monofunctional (meth)acrylate monomer may contain an ether bond and a fluorene functional group in the molecule. Specific examples of such monofunctional (meth)acrylate monomer include phenoxybenzyl (meth)acrylate, o-phenylphenol ethylene oxide (meth)acrylate, benzyl (meth)acrylate, 2-(phenylthio)ethyl (meth)acrylate, biphenylmethyl (meth)acrylate, or the like.

Meanwhile, the photoreactive monomer may have a weight average molecular weight of 50 g/mol to 1000 g/mol, or 200 g/mol to 600 g/mol. The weight average molecular weight refers to a weight average molecular weight converted in terms of polystyrene measured by GPC method.

Meanwhile, the hologram recording medium of the embodiment may include a photoinitiator. The photoinitiator is a compound which is activated by light or actinic radiation and initiates polymerization of a compound containing a photoreactive functional group such as the photoreactive monomer.

As the photoinitiator, commonly known photoinitiators can be used without particular limitation, but specific examples thereof include a photoradical polymerization initiator, a photocationic polymerization initiator, or a photoanionic polymerization initiator.

Specific examples of the photoradical polymerization initiator include imidazole derivatives, bisimidazole derivatives, N-aryl glycine derivatives, organic azide compounds, titanocene, aluminate complex, organic peroxide, N-alkoxypyridinium salts, thioxanthone derivatives, amine derivatives or the like. More specifically, examples of the photoradical polymerization initiator include 1,3-di(t-butyldioxycarbonyl)benzophenone, 3,3',4,4"-tetrakis(t-butyldioxycarbonyl)benzophenone, 3-phenyl-5-isoxazolone, 2-mercapto benzimidazole, bis(2,4,5-triphenyl)imidazole, 2,2-dimethoxy-1,2-diphenylethane-1-one (product name: Irgacure 651/manufacturer: BASF), 1-hydroxy-cyclohexyl-phenyl-ketone (product name: Irgacure 184/manufacturer: BASF), 2-benzyl-2-dimethylamino-1-(4-morpholinophenyl)-butanone-1 (product name: Irgacure 369/manufacturer: BASF), and bis(g5-2,4-cyclopentadiene-1-yl)-bis(2,6-difluoro-3-(1H-pyrrole-1-yl)-phenyl)titanium (product name: Irgacure 784/manufacturer: BASF), Ebecryl P-115(manufacturer: SK entis), and the like.

The photocationic polymerization initiator may include a diazonium salt, a sulfonium salt, or an iodonium salt, and examples thereof include sulfonic acid esters, imidosulfonates, dialkyl-4-hydroxysulfonium salts, arylsulfonic acid-p-nitrobenzyl esters, silanol-aluminum complexes, (η6-benzene) (η5-cyclopentadienyl)iron (II), or the like. In addition, benzoin tosylate, 2,5-dinitrobenzyltosylate, N-tosylphthalic acid imide, or the like can be mentioned. More specific examples of the photocationic polymerization initiator include commercially available products such as Cyracure UVI-6970, Cyracure UVI-6974 and Cyracure UVI-6990 (manufacturer: Dow Chemical Co. in USA), Irgacure 264 and Irgacure 250 (manufacturer: BASF) or CIT-1682 (manufacturer: Nippon Soda).

The photoanionic polymerization initiator may be borate salt, for example, butyryl chlorine butyl triphenyl borate, or the like. More specific examples of the photoanionic polymerization initiator include commercially available products such as Borate V (manufacturer: Spectra Group).

In addition, the photopolymer composition of the embodiment may include monomolecular (type I) initiator or bimolecular (type II) initiator. The (type I) system for free radical photopolymerization may include, for example, an aromatic ketone compounds in combination with a tertiary amine, such as benzophenone, alkylbenzophenone, 4,4'-bis(dimethylamino)benzophenone (Michler's ketone), anthrone and halogenated benzophenone or a mixture of these types. The bimolecular (type II) initiator may include benzoin and derivatives thereof, benzyl ketal, acylphosphine oxide, for example, 2,4,6-trimethylbenzoyldiphenylphosphine oxide, bisacylophosphine oxide, phenylglyoxyl ester, camphorquinone, alpha-aminoalkylphenone, alpha-dialkoxyacetophenone, 1-[4-(phenylthio)phenyl]octane-1,2-dione 2-(O-benzoyloxime), alpha-hydroxyalkylphenone, and the like.

The photopolymer composition of the embodiment may include 1% to 80% by weight of the polymer matrix or a precursor thereof; 1% to 80% by weight of the photoreactive monomer; 0.0001% to 10% by weight of the low refractive index fluorine-based compound; and 0.1% to 20% by weight of the photoinitiator. When the photopolymer composition further includes an organic solvent as described hereinafter, the content of the above-mentioned components is based on the total sum of the above-mentioned components (the total sum of the components excluding the organic solvent).

The photopolymer composition may further include a phosphate-based compound.

The phosphate-based compound acts as a plasticizer to lower the glass transition temperature of the polymer matrix and to increase the mobility of the photoreactive monomer and the low refractive components, and may contribute to the improvement of the formability of the photopolymer composition.

Specific examples of the phosphate-based compound include triphenyl phosphate, tricresyl phosphate, cresyl diphenyl phosphate, octyldiphenyl phosphate, diphenylbiphenyl phosphate, trioctyl phosphate, tributyl phosphate, and the like.

The phosphate-based compound may be added together with the above-mentioned fluorine-based compound at a weight ratio of 1:5 to 5:1. The phosphate-based compound may have a refractive index of less than 1.5 and a molecular weight of 700 or less.

The photopolymer composition may include other additives, and examples of the additives include a defoaming agent. As the defoaming agent, a silicone-based additive can be used, and an example thereof is Tego Rad 2500, BYK-3500 or the like.

Meanwhile, the photopolymer composition of the embodiment may further include a photoreactive dye.

The photosensitizing dye serves as photosensitizing pigment to sensitize the photoinitiator. More specifically, the photosensitizing dye may be stimulated by the light irradiated on the photopolymer composition and may also serve as an initiator to initiate polymerization of the monomer and the crosslinking monomer, Examples of the photosensitizing dyes are not particularly limited, and various compounds commonly known in the art can be used. Specific examples of the photosensitizing dye include sulfonium derivative of ceramidonine, new methylene blue, thioerythrosine triethylammonium, 6-acetylamino-2-methylceramidonin, eosin, erythrosine, rose bengal, thionine, basic yellow, Pinacyanol chloride, Rhodamine 6G, Gallocyanine, ethyl violet, Victoria blue R, Celestine blue, Quinaldine Red, Crystal Violet, Brilliant Green, Astrazon orange G, Darrow Red, Pyronin Y, Basic Red 29, pyrylium iodide, Safranin O, Cyanine, Methylene Blue, Azure A, or a combination of two or more thereof.

Meanwhile, the photopolymer composition may further include an organic solvent. Non-limiting examples of the organic solvent include ketones, alcohols, acetates, ethers, and mixtures of two or more thereof.

Specific examples of such organic solvent include ketones such as methyl ethyl ketone, methyl isobutyl ketone, acetylacetone or isobutyl ketone; alcohols such as methanol, ethanol, n-propanol, i-propanol, n-butanol, i-butanol or t-butanol; acetates such as ethyl acetate, i-propyl acetate, or polyethylene glycol monomethyl ether acetate; ethers such as tetrahydrofuran or propylene glycol monomethyl ether; or a mixture of two or more thereof.

The organic solvent may be added at the time of mixing the respective components contained in the photopolymer composition for producing the hologram recording medium, or may be contained in the photopolymer composition while adding the respective components in a state of being dispersed or mixed in an organic solvent. When the content of the organic solvent in the photopolymer composition is too low, the fluidity of the photopolymer composition may be lowered, resulting in the occurrence of defects such as the occurrence of striped patterns on the finally produced film. In addition, when the organic solvent is added in an excess amount, the solid content is lowered, and the coating and film formation are not sufficient, so that the physical properties and surface characteristics of the film may be deteriorated and defects may occur during the drying and curing process. Thereby, the photopolymer composition may include an organic solvent such that the total solid content concentration of the components contained is 1% to 70% by weight, or 2% to 50% by weight.

Meanwhile, according to another embodiment of the present disclosure, a hologram recording medium produced from the photopolymer composition can be provided.

The hologram recording medium can realize 50% or more, 85% or more, or 85 to 99% of diffraction efficiency at a thickness of 5 μm to 50 μm.

In the photopolymer composition for producing the hologram recording medium, the respective components contained therein are homogeneously mixed, dried and cured at a temperature of 20° C. or higher, and then subjected to predetermined exposure procedures, thereby producing a hologram for optical application in the entire visible range and the near ultraviolet region (300 to 800 nm).

In the photopolymer composition, the components forming a polymer matrix or the precursor thereof are first homogeneously mixed, and the other components are subsequently mixed together, thereby preparing the process of producing holograms.

In the photopolymer composition, for mixing the respective components contained therein, a mixing device, a stirrer, a mixer, or the like which are commonly known in the art can be used without particular limitation. The temperature in the mixing process may be 0° C. to 100° C., preferably 10° C. to 80° C., particularly preferably 20° C. to 60° C.

Meanwhile, the components forming a polymer matrix or the precursor thereof in the photopolymer composition are first homogenized and mixed, and then it can be a liquid formulation that is cured at a temperature of 20° C. or more. The curing temperature may vary depending on the composition of the photopolymer and the curing is promoted, for example, by heating at a temperature of from 30° C. to 180° C.

At the time of curing, the photopolymer may be in state of being injected into or coated onto a predetermined substrate or mold.

Meanwhile, as the method of recording a visual hologram on a hologram recording medium produced from the photopolymer composition, generally known methods can be used without particular limitation, and the method described in the holographic recording method of the embodiment described hereinafter can be adopted as one example.

Meanwhile, according to another embodiment of the present disclosure, there can be provided a holographic recording method which comprises selectively polymerizing the photoreactive monomer contained in the photopolymer composition by a coherent laser light.

As described above, through the process of mixing and curing the photopolymer composition, it is possible to produce a medium in a form in which no visual hologram is recorded, and a visual hologram can be recorded on the medium through a predetermined exposure process.

A visual hologram can be recorded on the media provided through the process of mixing and curing the photopolymer composition, using known devices and methods under commonly known conditions.

Meanwhile, according to another embodiment of the present disclosure, an optical element including the hologram recording medium can be provided.

Specific examples of the optical element include optical lenses, mirrors, deflecting mirrors, filters, diffusing screens, diffraction elements, light guides, waveguides, holographic optical elements having projection screen and/or mask functions, medium of optical memory system and light diffusion plate, optical wavelength multiplexers, reflection type, transmission type color filters, and the like.

An example of an optical element including the hologram recording medium may include a hologram display device.

The hologram display device includes a light source unit, an input unit, an SUBSTITUTE SPECIFICATION (clean) optical system, and a display unit. The light source unit is a portion that irradiates a laser beam used for providing, recording, and reproducing three-dimensional image information of an object in the input unit and the display unit. Further, the input unit is a portion that previously inputs three-dimensional image information of an object to be recorded on the display unit, and for example, three-dimensional information of an object such as the intensity and phase of light for each space can be inputted into an electrically addressed liquid crystal SLM, wherein an input beam may be used. The optical system may include a mirror, a polarizer, a beam splitter, a beam shutter, a lens, and the like. The optical system can be distributed into an input beam for sending a laser beam emitted from the light source unit to the input unit, a recording beam for sending the laser beam to the display unit, a reference beam, an erasing beam, a reading beam, and the like.

The display unit can receive three-dimensional image information of an object from an input unit, record it on a hologram plate comprising an optically addressed SLM, and reproduce the three-dimensional image of the object. In this case, the three-dimensional image information of the object can be recorded via interference of the input beam and the reference beam. The three-dimensional image information of the object recorded on the hologram plate can be reproduced into a three-dimensional image by the diffraction pattern generated by the reading beam. The erasing beam can be used to quickly remove the formed diffraction pattern. Meanwhile, the hologram plate can be moved between a position at which a three-dimensional image is inputted and a position at which a three-dimensional image is reproduced.

Advantageous Effects

According to the present disclosure, there can be provided a photopolymer composition for hologram production which can provide high refractive index modulation value and diffraction efficiency even while having a thin thickness, and which has a relatively fast reaction rate and thus can shorten the recording time, and which can realize high sensitivity to a recording light and improve recording efficiency, a hologram recording medium produced therefrom, an optical element comprising the same, and a holographic recording method using the hologram recording medium.

Detailed Description of the Embodiments

Hereinafter, the present disclosure will be described in more detail by way of the following examples. However, these examples are given for illustrative purposes only and are not intended to limit the scope of the present disclosure thereto.

Preparation Example 1: Preparation of Low Refractive Index Fluorine-Based Compound 20.51 g of 2,2'-((oxybis(1,1,2,2-tetrafluoroethane-2,1-diyl))bis(oxy))bis(2,2-difluoroethan-1-ol) was placed in a 1000 ml flask, and then dissolved in 500 g of tetrahydrofuran, and 4.40 g of sodium hydride (60% dispersion in mineral oil) was carefully added in several portions while stirring at 0° C. After stirring for 20 minutes at 0° C., 12.50 ml of 2-methoxyethoxymethyl chloride was slowly dropped. When it was confirmed by $^1$H NMR that the reactants have been completely consumed, all the reaction solvent was removed under reduced pressure. After extracting three times with 300 g of dichloromethane, the organic layer was collected, filtered with magnesium sulfate, and then all dichloromethane was removed under reduced pressure, thereby obtained 29 g of a liquid product having a purity of 95% or more in a yield of 98%.

Examples and Comparative Examples: Preparation of Photopolymer Composition

As shown in Table 1 and 2 below, a polymer matrix (Aldrich), a photoreactive monomer (high refractive acrylate, refractive index of 1.600, HR6022, Miwon), the non-reactive low refractive material of Preparation Example 1, tributyl phosphate (Aldrich). Safranin O (Aldrich), Borate V (Spectra group). Irgacure 250 (Onium salt, BASF) and methyl isobutyl ketone (MIBK) were mixed in the state of blocking light. For homogeneous mixing, the mixture was stirred at a temperature of 60° C. for 5 to 10 minutes. In addition, the mixture was stirred at room temperature for about 10 minutes with a Paste mixer to obtain a transparent coating solution, which was coated on a 80 μm-thick TAC substrate to a thickness of 15 μm and dried at 60° C. for 30 minutes.

Experimental Example: Holographic Recording (1) The surface coated with the photopolymer (hologram recording medium) prepared in each of Examples and Comparative Examples were laminated on a slide glass, and fixed so that a laser passes through the glass surface first at the time of recording.

(2) Measurement of Diffraction Efficiency (η)

A holographic recording was done via interference of two interference lights (reference light and object light), and the reflective recording was done so that the two beams were incident on the opposite side of the sample. The diffraction efficiencies are changed according to the incident angle of the two beams, and become non-slanted when the incident angles of the two beams are the same. In the non-slanted recording, the diffraction grating is generated vertically to the film because the incident angles of the two beams are the same on the normal basis.

The recording (reference light=30° and object light=40°) was done in a refractive-type slanted manner using a laser with a wavelength of 532 nm and the diffraction efficiency (q) was calculated according to the following general formula 1.

$$\eta = \frac{P_D}{P_D + P_T} \quad \text{[General Formula 1]}$$

in the general formula 1, q is a diffraction efficiency, $P_D$ is an output amount (mW/cm$^2$) of the diffracted beam of a sample after recording, and $P_T$ is an output amount (mW/cm$^2$) of the transmitted beam of the recorded sample.

TABLE 1

Measurement results of Experimental Examples of the photopolymer compositions (unit: g) of Examples and the hologram recording medium prepared therefrom

| Category | | Example 1 | Example 2 | Example 3 | Example 4 |
|---|---|---|---|---|---|
| Polymer matrix | Polyvinyl acetate (Sigma-Aldrich/Mw: about 100,000, Tg = 30° C.) | 27.6 | 27.6 | | |
| | Polyvinyl acetate (Sigma-Aldrich/Mw: about 140,000, Tg = 34° C.) | | | 27.6 | |
| | Polyvinyl acetate (Sigma-Aldrich/Mw: about 500,000, Tg = 45° C.) | | | | 27.6 |
| Photoreactive monomer | HR6022 (refractive index 1.600/Miwon) | 41.4 | 41.4 | 41.4 | 41.4 |
| Dye | Safranin O (Sigma-Aldrich) | 0.2 | 0.2 | 0.2 | 0.2 |
| Initiator | Borate salt (Borate V) | 0.3 | 0.3 | 0.3 | 0.3 |
| | Onium salt (Irgacure 250) | 0.1 | 0.1 | 0.1 | 0.1 |
| Plasticizer | Tributyl phosphate (Sigma-Aldrich) | | 15 | | |
| Low refractive index fluorine-based compound | Preparation Example 1 | 30 | 15 | 30 | 30 |
| Additive | BYK3500 (Silicone Modified Polyacrylate) | 0.4 | 0.4 | 0.4 | 0.4 |
| Solvent | MIBK | 200 | 200 | 200 | 200 |
| Diffraction efficiency (%) | | 95 | 60 | 80 | 50 |
| Coating thickness (unit: μm) | | 15 | 15 | 15 | 15 |

TABLE 2

Measurement results of Experimental Examples of the photopolymer compositions (unit: g) of Comparative Examples and the hologram recording medium prepared therefrom

| | Category | Comparative Example 1 | Comparative Example 2 | Comparative Example 3 |
|---|---|---|---|---|
| Polymer matrix | Polyvinyl acetate (Sigma-Aldrich/Mw: about 100,000, Tg = 30) | 49.5 | | |
| | Polyvinyl acetate (Sigma-Aldrich/Mw: about 140,000, Tg = 34) | | | |
| | Polyvinyl acetate (Sigma-Aldrich/Mw: about 500,000, Tg = 45) | | | |
| | Cellulose acetate butyrate (Sigma-Aldrich/Mw: about 70,000, Tg = 140) | | 27.6 | |
| | Cellulose acetate Propionate (Sigma-Aldrich/Mw: about 75,000, Tg = 180) | | | 27.6 |

TABLE 2-continued

Measurement results of Experimental Examples of the photopolymer compositions (unit: g) of Comparative Examples and the hologram recording medium prepared therefrom

| | Category | Comparative Example 1 | Comparative Example 2 | Comparative Example 3 |
|---|---|---|---|---|
| Photoreactive monomer | HR6022 (refractive index 1.600/Miwon) | 49.5 | 41.4 | 41.4 |
| Dye | Safranin O (Sigma-Aldrich) | 0.2 | 0.2 | 0.2 |
| Initiator | Borate salt (Borate V) | 0.3 | 0.3 | 0.3 |
| | Onium salt (Irgacure 250) | 0.1 | 0.1 | 0.1 |
| Plasticizer | Tributyl phosphate (Sigma-Aldrich) | | | |
| Low refractive index fluorine-based compound | Preparation Example 1 | | 30 | 30 |
| Additive | BYK3500 (Silicone Modified Polyacrylate) | 0.4 | 0.4 | 0.4 |
| Solvent | MIBK | 200 | 200 | 200 |
| Diffraction efficiency (%) | | 0 | 0 | 10 |
| Coating thickness (unit: μm) | | 15 | 15 | 15 |

As seen from Table 1 and Table 2 above, it was confirmed that the hologram media of Examples realized a diffractive efficiency of 50% or more, whereas the hologram media of Comparative Examples had a low diffraction efficiency of up to about 10%.

That is, from the evaluation result after hologram recording (532 nm Laser) with respect to Examples, it was clearly confirmed that a higher refractive index modulation value and diffraction efficiency can be realized due to the securing the fluidity of the components in the polymer matrix and the movement of non-reactive low refractive materials (non-reactive fluorine-based compounds and plasticizers).

The invention claimed is:

1. A photopolymer composition for hologram production comprising:
a polymer matrix or a polymeric precursor thereof, each of which having a glass transition temperature of 80° C. or less;
a photoreactive monomer;
a low refractive index fluorine-based compound; and
a photoinitiator,
wherein the low refractive index fluorine-based compound has a refractive index of less than 1.45, and
wherein the low refractive index fluorine-based compound has a linear structure comprising a polyalkylene oxide group at both ends of the linear structure, and two difluoromethylene groups directly bonded to each other or bonded to each other via an ether bond.

2. The photopolymer composition of claim 1, wherein the polymer matrix or the polymeric precursor thereof includes at least one polymer selected from the group consisting of polyvinyl acetate, polyvinyl butyrate, polyvinyl formal, polyvinyl carbazole, polyacrylic acid, polymethacrylonitrile, polyacrylonitrile, poly-1,2-dichloroethylene, ethylene-vinyl acetate copolymers, polymethyl methacrylate, syndiotactic polymethyl methacrylate, poly-α-vinyl naphthalate, polycarbonate, cellulose acetate, cellulose triacetate, cellulose acetate butyrate, polystyrene, poly-α-methylstyrene, poly-o-methylstyrene, poly-p-methylstyrene, poly-p-phenylstyrene, poly-p-chlorostyrene, poly-2,5-dichlorostyrene, polyarylate, polysulfone, polyethersulfone, hydrogenated styrene-butadiene-styrene copolymers, copolymers of (meth)acrylic acid cyclic aliphatic ester and methyl(meth)acrylate, polyurethane, polytetrafluoroethylene and polyvinylidene fluoride.

3. The photopolymer composition of claim 1, wherein the polymer matrix or the polymeric precursor thereof includes polyvinyl acetate having a glass transition temperature of 20° C. to 60° C. and a weight average molecular weight of 50,000 to 600,000.

4. The photopolymer composition of claim 1, wherein the low refractive index fluorine-based compound includes a compound represented by Chemical Formula 1,

[Chemical Formula 1]

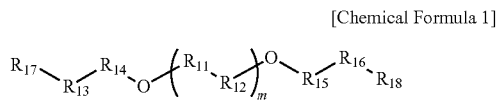

in the Chemical Formula 1,
$R_{11}$ and $R_{12}$ are each independently difluoromethylene group,
$R_{13}$ and $R_{16}$ are each independently methylene group,
$R_{14}$ and $R_{15}$ are each independently difluoromethylene group,
$R_{17}$ and $R_{18}$ are each independently polyalkylene oxide group, and
m is an integer of 1 or more.

5. The photopolymer composition of claim 1, wherein the photoreactive monomer includes a polyfunctional (meth)acrylate monomer or a monofunctional (meth)acrylate monomer.

6. The photopolymer composition of claim 1, comprising 1% to 80% by weight of the polymer matrix or the polymeric precursor thereof; 1% to 80% by weight of the photoreactive monomer; 0.0001% to 10% by weight of the low refractive index fluorine-based compound; and 0.1% to 20% by weight of the photoinitiator.

7. The photopolymer composition of claim 1, comprising 10 to 250 parts by weight of the low refractive index fluorine-based compound, based on 100 parts by weight of the photoreactive monomer.

8. The photopolymer composition of claim 1, wherein the photopolymer composition further comprises a phosphate-based compound.

9. A hologram recording medium produced from the photopolymer composition of claim 1.

10. An optical element comprising the hologram recording medium of claim 9.

11. A holographic recording method comprising selectively polymerizing the photoreactive monomer contained in the photopolymer composition of claim 1 using a coherent light source.

* * * * *